United States Patent
Saka

(10) Patent No.: US 8,547,038 B2
(45) Date of Patent: Oct. 1, 2013

(54) HIGH PRESSURE DISCHARGE LAMP LIGHTING DEVICE

(75) Inventor: Kosuke Saka, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 142 days.

(21) Appl. No.: 13/373,398

(22) Filed: Nov. 14, 2011

(65) Prior Publication Data

US 2012/0133302 A1    May 31, 2012

(30) Foreign Application Priority Data

Nov. 29, 2010   (JP) .................................. 2010-264701

(51) Int. Cl.
| | |
|---|---|
| *H01J 11/04* | (2006.01) |
| *H01J 13/48* | (2006.01) |
| *H01J 15/04* | (2006.01) |
| *H01J 17/36* | (2006.01) |

(52) U.S. Cl.
USPC ........... 315/326; 315/225; 315/247; 315/307; 315/349

(58) Field of Classification Search
None
See application file for complete search history.

(56) References Cited

U.S. PATENT DOCUMENTS

| | | |
|---|---|---|
| 5,109,181 A | 4/1992 | Fischer et al. |
| 5,917,558 A | 6/1999 | Stanton |
| 8,436,545 B2 * | 5/2013 | Goto et al. ................... 315/246 |
| 2011/0025989 A1 * | 2/2011 | Ono et al. ....................... 353/85 |
| 2011/0121746 A1 * | 5/2011 | Yamamoto et al. ........... 315/287 |

FOREIGN PATENT DOCUMENTS

| | | |
|---|---|---|
| JP | 2-148561 | 6/1990 |
| JP | 08-505031 | 5/1996 |
| JP | 2006-254165 A | 9/2006 |
| JP | 2007-188733 A | 7/2007 |

OTHER PUBLICATIONS

Office Action issued in Japanese Patent Application No. 2010-264701, dated Sep. 25, 2012.

* cited by examiner

*Primary Examiner* — Anh Tran
(74) *Attorney, Agent, or Firm* — Rader, Fishman & Grauer PLLC

(57) ABSTRACT

A high-pressure discharge lamp lighting device is used for projector devices that allow controlling the mean electric power at a desired value with a slow processing speed. A color wheel rotates and disperses the beam from lamp into each of the color components, such that the electric power supplied to the lamp is controlled at different levels for each segment of the color wheel and the power feeding device control part finds the mean electric power by sampling the electric power supplied.

2 Claims, 7 Drawing Sheets

HIGH PRESSURE DISCHARGE LAMP LIGHTING DEVICE

CROSS-REFERENCES TO RELATED APPLICATION

This application claims priority from Japanese Patent Application Serial No. 2010-264701 filed Nov. 29, 2010, the contents of which are incorporated herein by reference in their entirety.

TECHNICAL FIELD

The present invention relates to a high-pressure discharge lamp lighting device that is loaded in projectors, and in particular, an alternating current lighting type high-pressure discharge lamp that encloses mercury at 0.15 mg/mm$^3$ or greater in an arc tube where the mercury vapor pressure at the time of lighting is high, for example, 110 atmospheres or greater. Further, the high-pressure discharge lamp lighting device may be used as a light source for projector devices, rear-projection TVs, and the like.

BACKGROUND

Projector devices are required to illuminate images evenly with sufficient color rendering against a rectangular screen, and therefore, as a light source, metal halide lamps that enclose mercury and metal halogen compounds have been used. In addition, recently, further size reductions and the employment of a point light source have advanced and those with an extremely short distance between the electrodes have been put to practical use. Given the background, recently, in place of metal halide lamps, high-pressure discharge lamps having an extremely high mercury vapor pressure, such as 20 MPa (approximately 197 atmospheres) or greater have been used. These lamps have a limited arc spread and a further increase in light output do to their high mercury vapor pressure.

As an above-mentioned lamp, for example, an ultra high-pressure discharge lamp having a quartz glass arc tube with a pair of electrodes that face each other at a 2 mm or less interval that encloses mercury at 0.15 mg/mm$^3$ or greater, a noble gas, and a halogen in the range of 10$^{-6}$ μmol/mm$^3$ to 10$^{-2}$ μmol/mm$^3$ can be used. This type of discharge lamp and its lighting device are, for example disclosed in Japanese Unexamined Application Publication No. H02-148561. The high-pressure discharge lamp disclosed in Japanese Unexamined Application Publication H02-148561 is one in which the inner mercury vapor pressure at a normal power lighting is 15 MPa to 35 MPa, and a halide is enclosed in the arc tube in the range from 10$^{-6}$ μmol/mm$^3$ to 10$^{-2}$ μmol/mm$^3$. It has a pair of electrodes in the arc tube and by having a protruding part around the center of the electrode tip, it limits the generation of the so-called arc jump phenomenon in which the location of the discharge arc is not stable at the center or periphery of the electrode tips and moves around. In addition, a lighting device, which is comprised of a DC/DC converter, a DC/AC converter, and a high-pressure generation device, applies an alternating current between the above-mentioned pair of electrodes. Thus, lighting is carried out.

Recently, projectors are provided not only for presentations but also for movie viewing as well. However, it has been known from the past that single-panel projectors that combine a light bulb and color wheel have poor color reproducibility of the projected images. To resolve the problem, for example, Japanese Unexamined Application Publication H08-505031 exists. This literature lists a method in which a lamp is lit by modulating the light intensity for each segment that is separated by the color wheel.

SUMMARY

The present invention relates to a high-pressure discharge lamp lighting device in operative connection with a color wheel and a discharge lamp, comprising an electric power detection circuit that detects a supply power supplied to the discharge lamp for each segment that corresponds to a rotation angle of the color wheel; and a control circuit that includes a sampling circuit for sampling the supply power, a memory that stores results of sampling the supply power, a mean power calculator that calculates the mean power at a designated duration based on the results retained in the memory, and a power control part that controls a feedback supply power to the discharge lamp based on the mean power, wherein sampling the supply power follows a sampling cycle set to Ts>Tc/C and Ts≠N×Tc, where N is a whole number, Ts is the sampling cycle, C is a total number of segments of the color wheel, and Tc is a cycle for scanning of all the segments of the color wheel. Further, the sampling cycle Ts may be set so that Ts≤60 seconds.

BRIEF DESCRIPTION OF THE DRAWINGS

FIG. 6A is a flowchart when the number of samples is less than or equal to 15 and FIG. 6B is a flowchart when the number of samples exceeds 15.

MODE FOR CARRYING OUT THE INVENTION

Figure 1:
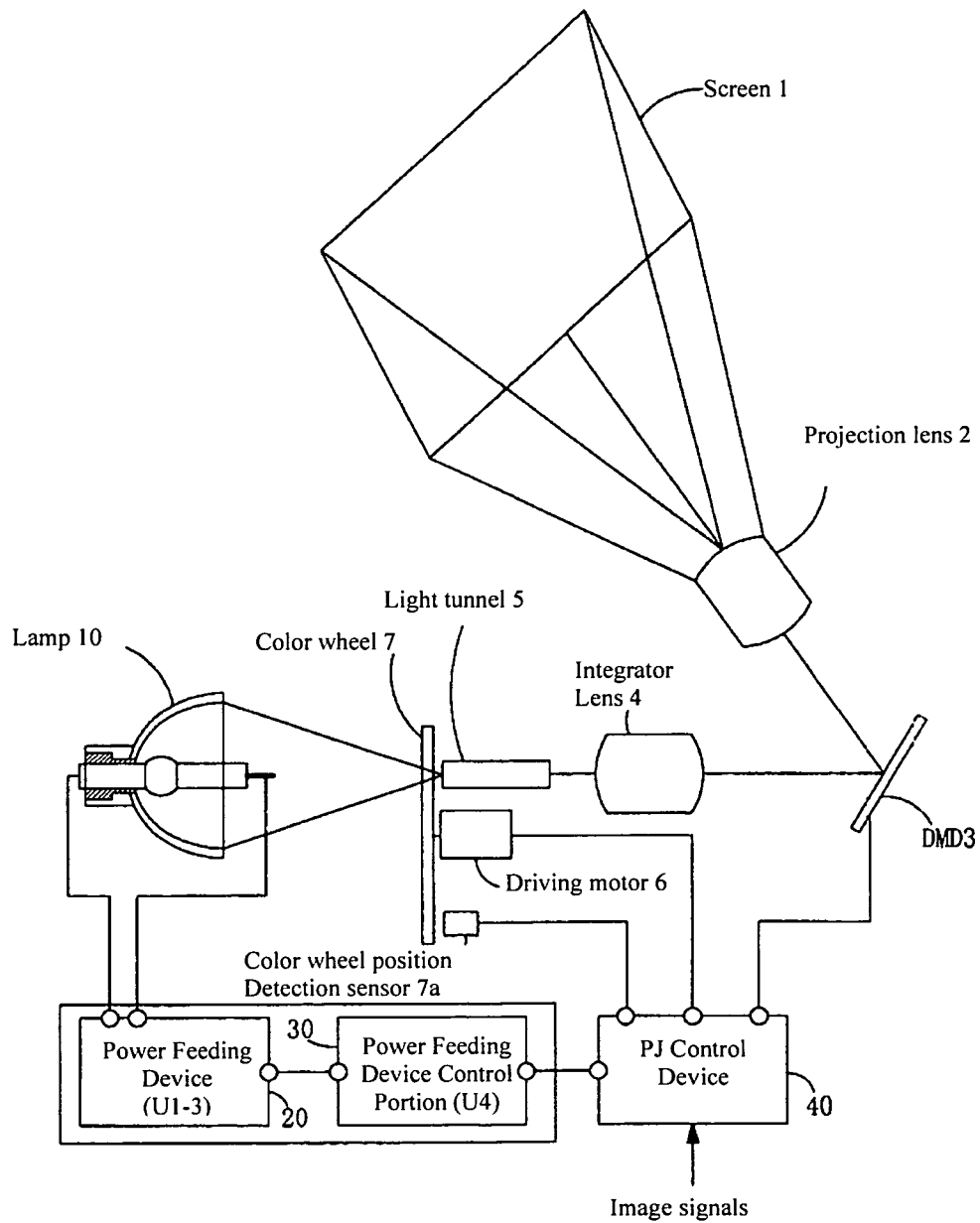
FIG. 1 is a schematic view of the entire projector device having a discharge lamp power feeding device.

As described above, to have superior color reproducibility of the projected images, projector devices modulate the light intensity for each segment that is separated by the color wheel to light the lamp. In other words, by synchronizing with the rotation of the color wheel, the amount of the electric power supplied to the lamp is modified for each segment of the color wheel, thereby improving the reproducibility of the projected images. Often, a projector device is structured so that it can be used by switching between a normal mode, for which the lamp is lit at a normal power, an eco-mode and a super eco-mode in which the electric power is reduced while in use. As shown in the patent literature 2, even under the condition in which the light intensity is modulated depending on the segment of the color wheel, it is necessary that the average electric power that is supplied to the lamp be controlled depending on such lighting mode.

To carry out feedback control of the average value of the electric power to be supplied to the lamp for projectors with a structure in which the electric power that is supplied to the lamp is modified depending on the segment of the color wheel, for example, the angle of rotation of the color wheel and the electric power for the lamp for each segment that is synchronized with the rotation of the color wheel are detected. Then the mean is found, and the feedback control is carried out so that the mean electric power becomes the desired value. However, this method requires sampling of the lamp electric power for each segment and a calculation of the mean electric power, making high-speed calculations necessary. Time required to scan all the segments of the color wheel (in other words, the time that is required for the color wheel to rotate at rotation angles that correspond to all the segments of the color wheel) is called the scanning time of the color wheel (cycle). The scanning cycle of the color wheel is, if the number of rotations is 120 per second, approximately 8.3 ms. Therefore, if the number of segments for a color wheel is, for example 4, to sample the lamp electric power for each segment the sampling cycle is approximately $8.3/4 \cong 2$ ms or greater, which requires significantly high-speed processing. Therefore, use of a processor with high-speed processing is required and consequently the cost of the device increases.

To resolve the above-mentioned problem, a high-pressure discharge lamp lighting device that is used for projector devices with a structure in which the light intensity is modulated for each segment of the color wheel, wherein, it is a high-pressure discharge lamp lighting device that can control the mean electric power supplied to the lamp to be a desirable value, using a relatively inexpensive processor with a slow processing speed is provided.

When the lamp electric power for each segment of the color wheel is detected and its mean is found to control the lamp electric power, the mean electric power can be control precisely. However, as described above, a processor with a high processing speed is required. Therefore, methods to detect the electric power supplied to the lamp for all the segments of the color wheel and find its mean, using a processor with a relatively slow processing speed were investigated. As a result, it was found that when the electric power supplied to the lamp is sampled at a sampling cycle that is different from the above-mentioned scanning cycle of the color wheel, and sampling data that is at least equal to or greater than the number of segments for the color wheel is obtained, and their mean is found, then, the mean that is approximately the same size as the mean that is found through detecting the lamp electric power for each segment, as described above, can be found. This is because the values of the scanning cycle of the color wheel and the sampling cycle are different. Therefore, every time it is sampled (or at every set number of sampling), the electric power supplied to the lamp can be detected for a different segment.

Thus, selecting a sampling cycle that is not synchronized with the rotation cycle of the color wheel but can evenly detect the electric power value for each color is preferred because at the same time, the mean value does not fluctuate for each control cycle, and electric power is sampled, and then the mean electric power is found for each control cycle. Thus, the mean power is controlled. In addition, when a discharge lamp is feedback controlled, if a feedback control cycle is too long, the distance between the electrodes is changed, and the lamp electric power significantly fluctuates. Therefore, it is desirable to set a feedback cycle to be 60 seconds or less, which is the time when the distance between the electrodes changes, and the sampling cycles are also required to be set at 60 seconds or less.

Based on the above, the present invention relates to a high-pressure discharge lamp lighting device in operative connection with a color wheel and a discharge lamp, comprising an electric power detection circuit that detects a supply power supplied to the discharge lamp for each segment that corresponds to a rotation angle of the color wheel; and a control circuit that includes a sampling circuit for sampling the supply power, a memory that stores results of sampling the supply power, a mean power calculator that calculates the mean power at a designated duration based on the results retained in the memory, and a power control part that controls a feedback supply power to the discharge lamp based on the mean power, wherein sampling the supply power follows a sampling cycle set to $Ts>Tc/C$ and $Ts \approx N \times Tc$, where N is a whole number, Ts is the sampling cycle, C is a total number of segments of the color wheel, and Tc is a cycle for scanning of all the segments of the color wheel.

Further, the sampling cycle Ts may be set so that $Ts \leq 60$ seconds.

In accordance with the above described, the following effects can be obtained. When the above-mentioned sampling cycle is Ts, the above-mentioned total number of segments of the color wheel is C, and the cycle for the scanning of all the segments of the color wheel is Tc, the above-mentioned sampling cycle is set so that $Ts>Tc/C$ and $Ts \neq N \times Tc$ (N is a whole number). Therefore, every time it is sampled, or every set of times it is sampled, the lamp supply power at a different segment can be detected. Further, by sampling a number of times that is greater than a set time, a value equivalent to the mean value of the lamp power for all the segments of the color wheel can be obtained. Furthermore, by using a processing device with a relatively slow processing speed, the mean value of the power can be controlled so that it matches the standard power that corresponds to each lighting mode, and therefore, the discharge lamp can be lit at a light intensity that corresponds to each of the lighting modes. When the sampling cycle is set to be 60 seconds or less and it is feedback controlled at a cycle shorter than the cycle when the lamp property significantly fluctuates due to changes in the distance between the electrodes of the discharge lamp, stable control of the mean power that is supplied to the discharge lamp is achieved.

First the structure of the projector device used to describe an embodiment of the present invention is briefly explained. The following shows an example in which a DMD (digital micro-mirror device) (trademark) is employed for a projector device with a DLP (Digital Light Processing) (trademark) method. A DMD is comprised of mirror elements, and the size of the mirror elements is minute, for example, 2.3 million of them are arranged in an area of 20 mm and 35 mm. The image is projected on a screen by driving each of the mirror elements independently by corresponding to the input signals, into either of two directions, which are a direction that allows an incident illuminating ray and a direction that does not.

FIG. 1 is a schematic view of the entire projector device having a discharge lamp power feeding device. As shown in FIG. 1, the projector device is comprised of: a high-pressure discharge lamp 10 (hereinafter referred to as lamp 10 as well), a color wheel 7 that disperses the beam from said lamp 10 into each of the color components, a driving motor 6 that rotates and drives said color wheel 7, a projector control device 40 that drives and controls said driving motor 6 and a DMD 3, a power feeding control part 30 that receives signals from projector control device 40 and controls the power feeding device 20, and a power feeding device 20 that receives signals from said power feeding control part 30 and feeds power to the high-pressure discharge lamp 10. The projector control device 40 detects the rotation position of the color wheel 7 by the color wheel position detection sensor 7a, and as described in the above-mentioned patent literature 2, the amount of electric power supplied to the lamp 10 for each segment of the color wheel is controlled depending on the position of the color wheel 7. In addition, as described in a later section, the power feeding device control part 30 controls the mean electric power to be supplied to the lamp 10 by controlling the power feeding device 20 depending on the lighting mode signals. The beam from the lamp 10 passes through the color wheel 7, and then is guided through the light tunnel 5, and after passing the integrator lens 4, it is reflected the DMD 3, which is controlled by the projector control device 40, and projected to the screen 1 by the projection lens 2.

The color wheel 7 used in the DLP projector device is an approximate disk shape in which, for example, red (R), green (G), blue (B), and colorless and transparent (W) segments are arranged in the rotating direction. It rotates around the rotation axis by the driving motor 6, and disperses the transmitted light into each of the color components at a time interval. For a DLP method projector device, the arrangement of the segments of the color wheel 7 determines the brightness and color reproducibility of the projected image, and therefore, a color wheel that matches the purpose is installed.

Figure 2:
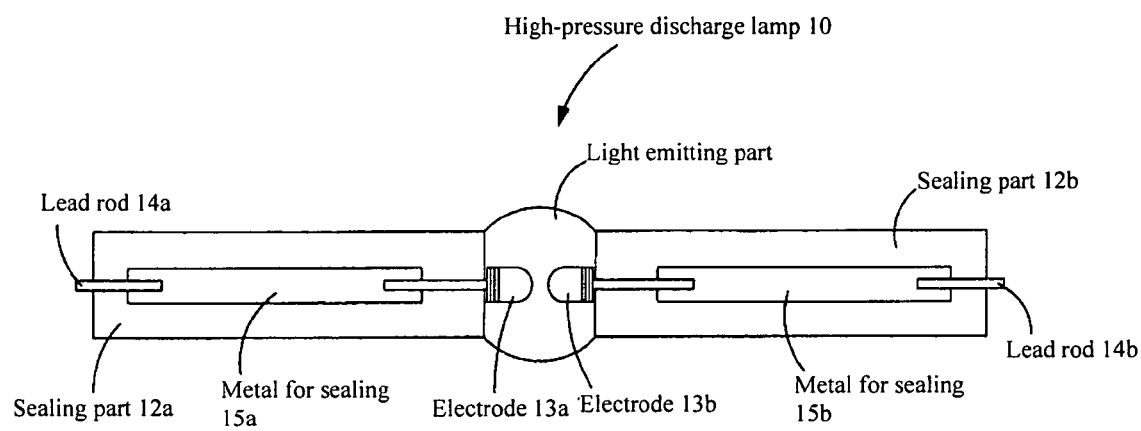
FIG. 2 is a diagram that shows an example of the high-pressure discharge lamp structure.

FIG. 2 is a diagram that shows an example of the high-pressure discharge lamp structure. FIG. 2 shows an example of a lamp used for the present invention. It has a arc tube that is comprised of a spherical light emitting part 11, and rod shaped sealing parts 12a and 12b, which are positioned continuously on both edges of the light emitting part 11 and outwardly extended in the direction of the tube axis. Inside the arc tube, a pair of electrodes 13a and 13b are arranged to face each other and as a discharge medium, for example, mercury is enclosed. Mercury is enclosed at 0.15 mg/mm$^3$ or greater, so that the pressure inside the inner space of the arc tube becomes 110 atmospheres or greater during the lighting. In addition to mercury, a noble gas and halogen gas are filled in the inner space of the arc tube. On each of the sealing parts 12a and 12b, molybdenum foils are buried in an air-tight manner as metals for sealing 15a and 15b, and on the tip of each of the metals for sealing, bases of the electrodes 13a and 13b are electrically connected. On the base edge of the metals for sealing, lead rods 14a and 14b for feeding power, which protrude outwardly from the outer edge surface of the sealing parts 12a and 12b, are electrically connected. As a noble gas, for example, approximately 13 kPa of argon gas is enclosed. Its function is to improve the startup performance of the lighting. A halogen, iodine, bromine or chlorine, or the like is filled in the form of a compound with mercury or another metal. The amount of the halogen enclosed is selected from the range of $5\times10^{-5}$ to $7\times10^{-3}$ μmol/mm$^3$. The halogen lengthens the operating life by utilizing the so-called halogen cycle. For discharge lamps that are extremely compact and have a high vapor pressure at lighting halogen has the effect of preventing the discharge container from devitrification. An example of the lamp figure is, for example, a maximum external diameter of the light emitting part 11 being 12 mm, the distance between electrodes being 1.5 mm, and a power rating of 330 W, and it is lit with alternating current at approximately 350 Hz. The reason that the lighting frequency is approximate is because it is adjusted by synchronizing with the rotation value of the color wheel.

Figure 3:
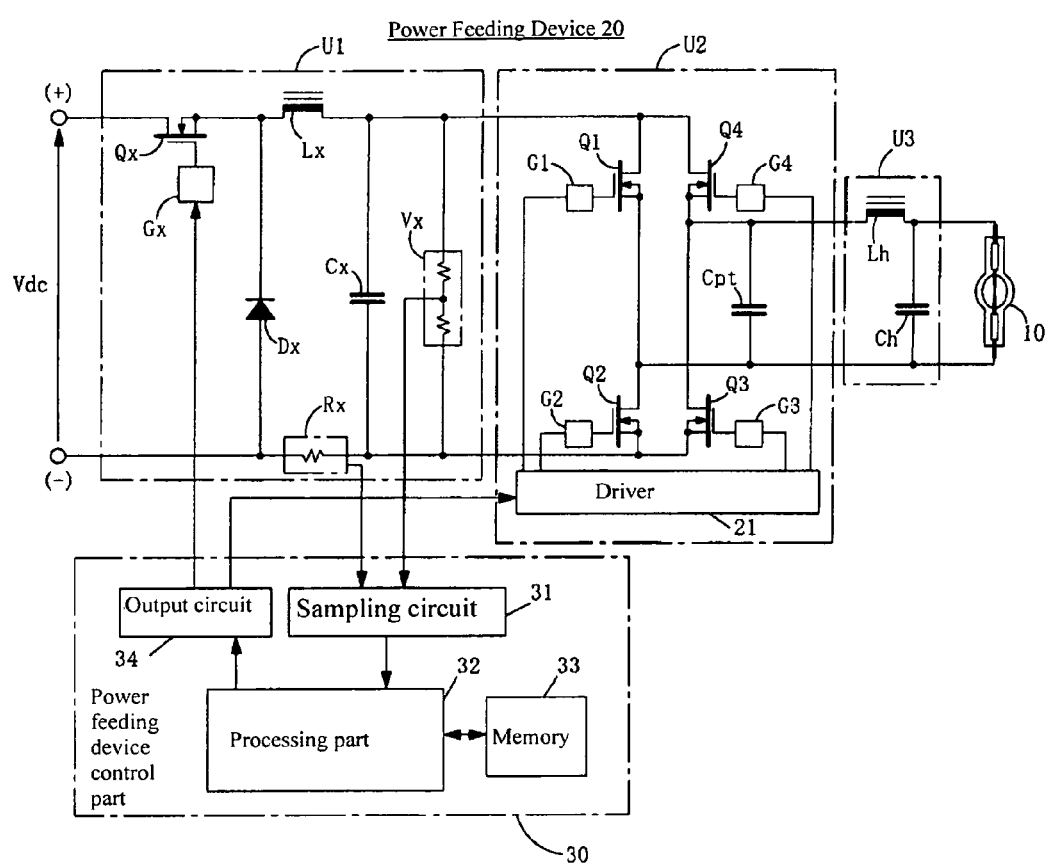
FIG. 3 is a diagram of an embodiment that shows a structure of the power feeding device and power feeding device controlling.
Figure 4:
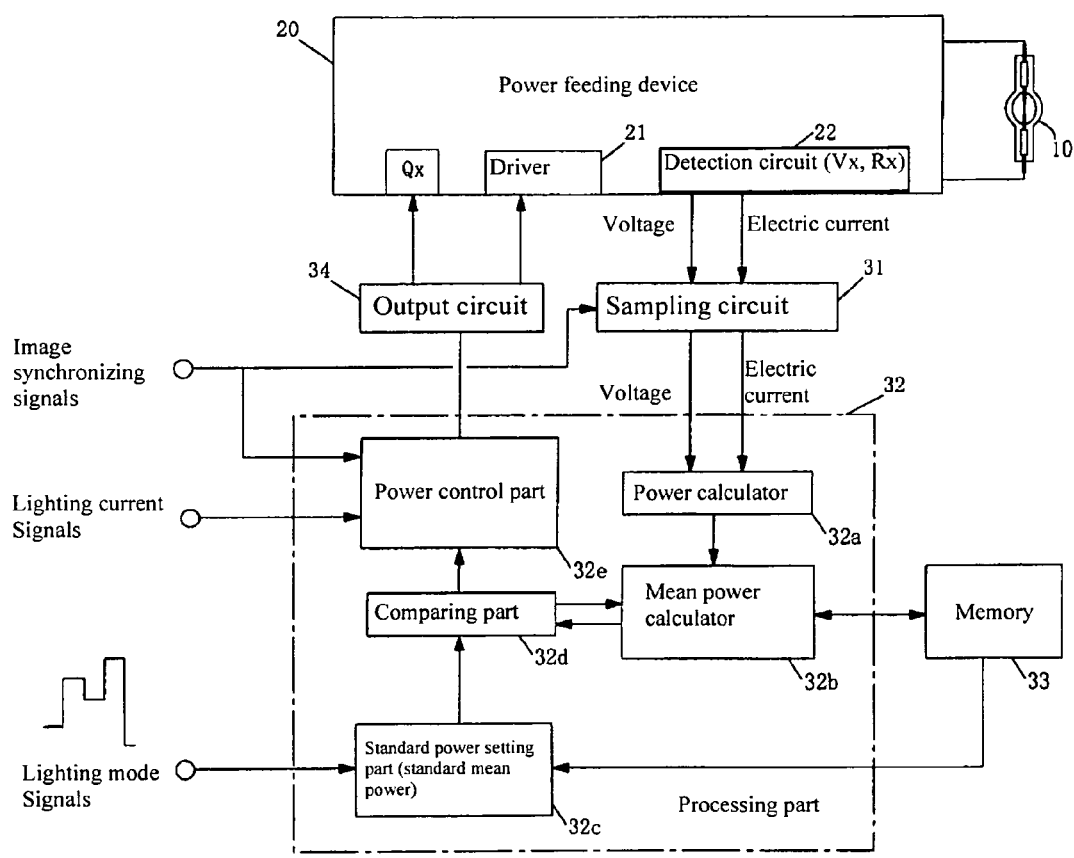
FIG. 4 is a block diagram that shows a functional structure of a part of the power feeding device control part shown in FIG. 3.

Next, embodiments of the power feeding device 20 and power feeding device control part 30 (hereinafter referred to as control part 30) in the projector device shown in FIG. 1 are shown in FIGS. 3 and 4. FIG. 3 is a diagram of an embodiment that shows a structure of the power feeding device and power feeding device controlling. FIG. 4 is a block diagram that shows a functional structure of a part of the power feeding device control part shown in FIG. 3. In FIG. 3, power feeding device 20 is roughly comprised of a step-down chopper circuit U1, a full bridge circuit U2, and a starter circuit U3. The step-down chopper circuit U1 comprising a switching element Qx and a reactor Lx that are connected to the positive side power terminal where a direct current voltage is supplied; a diode Dx that is connected between the connecting point between switching element Qx and reactor Lx, and the negative side power terminal; a smoothing capacitor Cx that is connected to the output side of the reactor Lx; and a resistor Rx, which is connected between the negative side terminal of the smoothing capacitor Cx and the anode side of the diode Dx. The above-mentioned switching element Qx is driven by gate signal Gx that is output from the control part 30, and by driving the switching element Qx at a designated duty, the input direct current voltage Vdc is stepped down to a voltage that corresponds to the duty. A serial circuit Vx that is a resistor to detect the voltage is provided on the output side of the step-down chopper circuit U1. The full bridge circuit U2 comprises switching elements Q1 to Q4 that are connected in the shape of bridges, and these switching elements Q1 to Q4 are driven by gate signals G1 to G4 output from the driver 21. By alternately turning on a set of switching elements Q1 and Q4, and Q2 and Q3 that are diagonally positioned, a square-wave alternating voltage is generated between the connecting point of switching elements Q1 and Q2 and the connecting point of switching elements Q3 and Q4.

Starter circuit U3 comprises a coil Lh, and capacitor Ch. By outputting a frequency, which is equivalent to the resonance frequency of the resonance circuit that is comprised of a coil Lh and capacitor Ch through its resonance effect, a high voltage can be generated to the capacitor Ch. Therefore, the starter circuit U3 is operated at a high frequency, only at startup, and a high voltage is applied on both edges of the discharge lamp 10. Thus, the lamp is lit.

In the above-mentioned circuit, to change the driving frequency of the full bridge circuit U2 during normal lamp operation, the switching cycle of the switching elements Q1 to Q4 of the full bridge circuit U2 should be adjusted. Further, the output power can be achieved through an adjustment of the operation duty of the switching element Qx of the step-down chopper circuit U1. The switching element Qx of the step-down chopper circuit U1 is turned on/off in correspondence to the duty of the gate signal Gx, which is output from the control part 30, and the power that is supplied to the lamp 10 changes. In other words, to increase the power, by changing the duty of Qx, the gate signal Gx is controlled, so that the power value matches the inputted power adjustment signal value.

The control part 30 comprising a current detection circuit that contains the above-mentioned resistor Rx; sampling circuit 31 that samples the electric current and voltage that are detected by the voltage detection circuit, which is comprised of a resistor serial circuit Vx, at a preset sampling cycle Ts; a processing part 32 that is comprised of a processor that calculates the electric power from the voltage and current that are sampled by the sampling circuit 31 and performs control so that the mean electric power will be the mean electric power that corresponds to the lighting mode; a memory 33 that stores the above-mentioned calculation results and a variety of data; and an output circuit 34 that outputs the driving signal for the above-mentioned switching element Qx and driver 21 by a control signal output by the processing part 32.

The sampling cycle Ts for the above-mentioned sampling circuit 31 is set longer than the time it takes the segments of the above-mentioned color wheel 7 to be switched. For example, if the segments are R, G, B, and W, then it is longer than the time it takes to switch from R to G, G to B, B to W, and W to R. And as described above, the lamp power cannot be detected for each segment of the color wheel 7. In other words, when the total number of the segments of the above-mentioned color wheel is C (as describe above, for example, there are R, G, B and W segments and C=4), and the cycle when all the segments of the above-mentioned color wheel is scanned is Tc, then it is set so that Ts>Tc/C (for example, if Tc=8.3 ms, then Ts>8.3/4≅2 ms). Therefore, the processor used for the above-mentioned processing part 32 is acceptable as long as it can process the sampled data at this sampling cycle, and there is no need to use an expensive high-speed processor. Further, the above-mentioned sampling cycle Ts is set so that Ts≠N×Tc (N is a whole number). Furthermore, as described above, the supply power for the lamp at different segments can be detected for every sampling or every set of samplings.

FIG. 4 is a block diagram of a functional structure of the above-mentioned processing part 32. The processing part 32 comprising a power calculation part 32a that calculates the voltage and current sampled by the sampling circuit 31 to find the lamp power; a mean power calculation part 32b that finds the mean electric power at a designated duration from the lamp power calculated by said power calculation part 32a; a standard power setting part 32c that sets a standard power (standard mean power) that corresponds to the lighting mode signal given from outside; a comparing part 32d that compares the standard power value that is output from the standard power setting part 32c and the mean electric power that is found by the mean power calculation part 32b; and a power control part 32e that controls the power supplied to the lamp based on the comparison results from the comparing part 32d. Projector control device 40 gives an image synchronizing signal, which synchronized with the rotation position signal of the color wheel 7, a lighting current signal, and lighting mode signal to the processing part 32. An image synchronizing signal that corresponds to the rotation angle of the color wheel is input to the sampling circuit 31, and the sampling circuit 31 samples the voltage and current that are detected by the detection circuit 22 at a cycle Ts, which is different from the cycle of the image synchronizing signal cycle (scanning cycle Tc of the color wheel). In addition, the power control part 32e controls the electric current for the lamp 10 depending on the lighting current signal that is given by the projector control device 40, and at the same time, based on the comparative results of the above-mentioned comparing part 32d, it controls the duty of the switching element Qx of the step-down chopper circuit U1 and controls the mean electric power of the lamp. Further, the power control part 32e controls the driver 21 via the output circuit 34, and controls the driving frequency, etc., of the above-mentioned full bridge circuit U2. When a lighting mode signal is input, the standard electric power setting part 32c reads the standard electric power (standard mean electric power) that corresponds to the lighting mode signal and sets a standard electric power that corresponds to the lighting mode.

Figure 5:
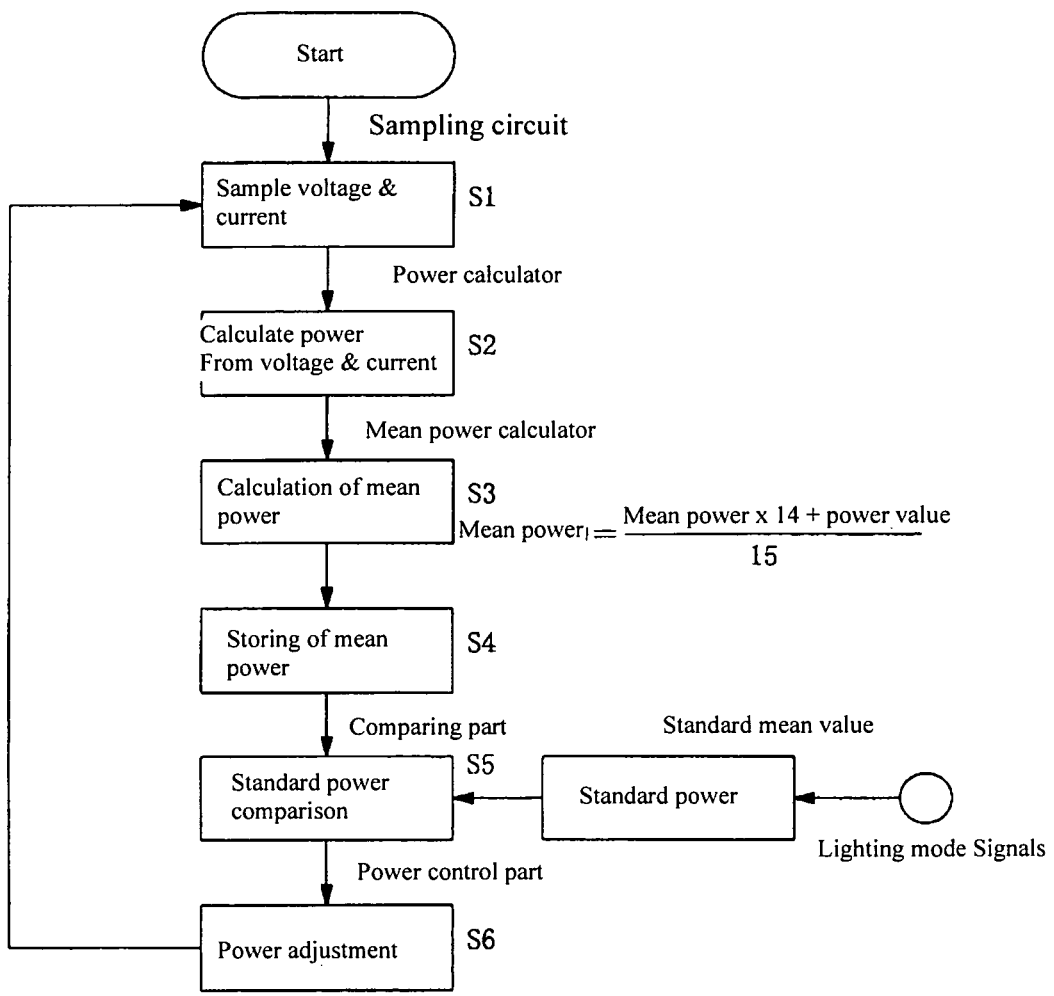
FIG. 5 is a flowchart that shows the process of the processor.
Figure 6:
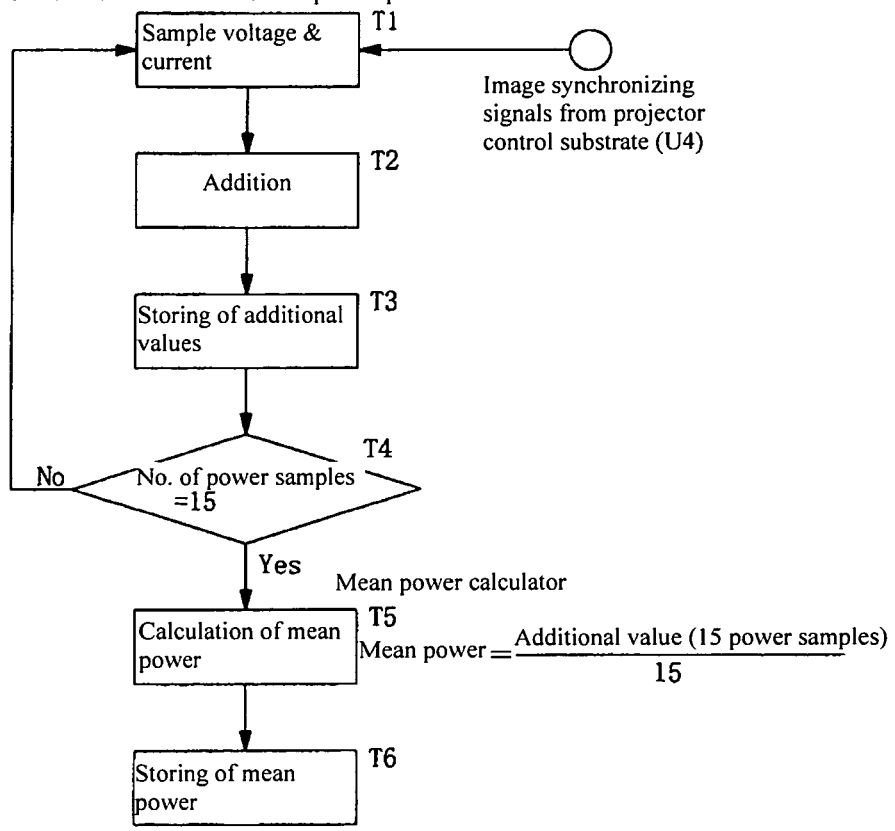
FIGS. 6A-6B are flowcharts that show the calculation process of the mean value, where
Figure 6:
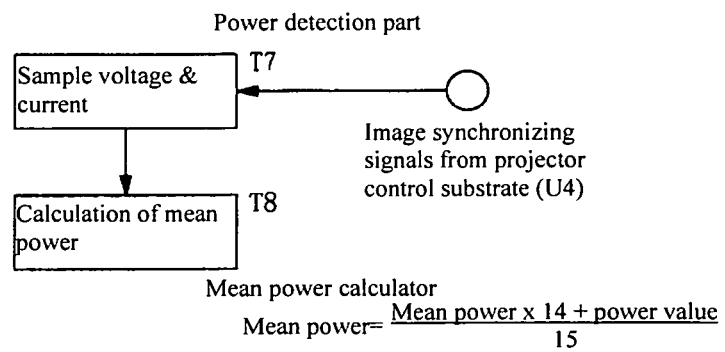
Figure 7:
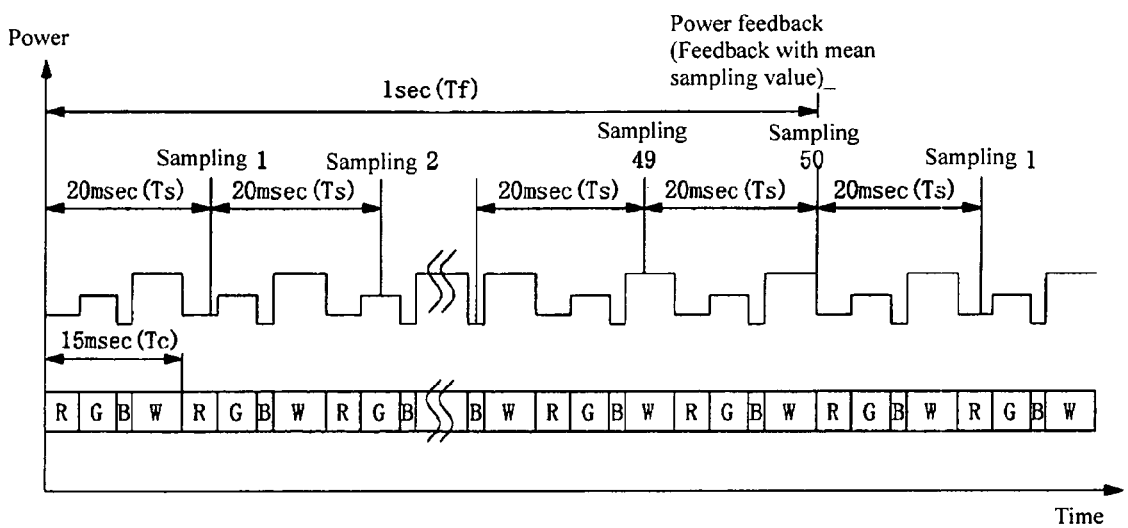
FIG. 7 is a time chart that shows the fluctuation of the electric power supplied to the lamp at each segment of the color wheel, segment cycle Tc, sampling cycle Ts, and feedback cycle Tf.

FIG. 5 is a flowchart that shows the process of the processor. FIGS. 6A and 6B are flowcharts that show the calculation process of the mean value, where (a) is a flowchart when the number of samples is less than or equal to 15 and (b) is a flowchart when the number of samples exceeds 15. FIG. 7 is a time chart that shows the fluctuation of the electric power supplied to the lamp at each segment of the color wheel, segment cycle Tc, sampling cycle Ts, and feedback cycle Tf. Referring to FIGS. 3-7, the operation of the high-pressure discharge lamp lighting device of an embodiment is described as follows. The sampling circuit 31 that is shown in FIGS. 3 and 4 samples the voltage and electric current at a preset sampling cycle Ts, and the power calculation part 32a calculates the power based on the sampled voltage and the electric current (Steps S1 and S2 in FIG. 5). The mean electric power calculation part 32b finds a mean power based on the power value that is found by the above-mentioned sampling (Step S3 in FIG. 5).

As described previously, the scanning cycle (when R, G, B, and W are scanned in one rotation, it is equivalent to the rotation cycle and hereinafter referred to as a rotation cycle as well) Tc of the color wheel and the above-mentioned sampling cycle Ts are different, and therefore, for the segment where the electric power is detected, the power of the different segment is detected at every set of samplings. For example, in FIG. 7, sample 50 ($50^{th}$ sample) is synchronized with the rotation angle signal (image synchronizing signal); however, the sampling cycle Ts and the cycle of the image synchronizing signal are not identical. Thus, sample 1 ($1^{st}$ sample) detected a power for the red (R) and sample 2 detected a power for green (G), and every time it samples the segment for the sampling shifts. In this embodiment, 50 samples are carried out for every feedback cycle Tf, and with 50 power detections, the power detection for all the segments can be carried out.

The mean electric power can be, for example, found as shown in the flowchart in FIGS. 6A and 6B. Here, in this case the mean electric power is calculated from 15 sample values is described. As shown in FIG. 6A, until the first 15 data are sampled, the power is calculated from the voltage and current (Step T1) and the calculated power is added to the power that is previously calculated (0 the first time) and the added value is stored in the memory 33 (Steps T2 and T3). This process is repeated until the number of samples reaches 15 (Step T4), and when the number of sample reaches 15, using the following formula, the mean electric power calculation part 32b calculates the mean electric power Av1, and the mean electric power Av1 is stored in the memory 33. (Steps T5 and T6). Mean electric power Av1=added value (15 electric power samples)/15.

As described above, when the mean value Av1 of the electric power for the first 15 samples is found, then using the process shown in FIG. 6B, the mean electric power Av is found. Electric power P is calculated from the sampled voltage and electric current (Step T7), and from the mean electric power Av1 that is found in FIG. 6 (a) and stored in the memory 33, and the sample value P of the electric power that is calculated as above, using the following formula, the mean electric power Av is calculated. Mean electric power Av=(mean electric power Av1×14+sample value P)/15. The above-mentioned mean electric power Av is stored as a mean electric power Av1, (Step S4 in FIG. 5), and during the successive process, based on the above-mentioned formula, the mean value is calculated.

When the mean electric power is calculated, it proceeds to Step S5 of FIG. 5, and the standard electric power (standard mean electric power) that is set by the lighting mode signal and the mean electric power that is calculated as above are compared. In the memory 33 shown in FIG. 4, the mean electric power for the lamp that is the standard for each lighting mode (hereinafter referred to as the standard electric power) is stored, and the standard electric power setting part 32c outputs the standard electric power that corresponds to the lighting mode signal to the comparing part 32d, and the comparing part 32 compares the standard electric power and the mean electric power that is calculated as above. Depending on the comparison results by the above-mentioned comparing part 32d, the electric power control part 32e carries out a feedback control so that the mean lamp electric power becomes the standard power at a cycle of Tf in FIG. 7 (for example 1 second) (Step S6 in FIG. 5). Such feedback control is repeatedly carried out while the lamp is lit.

By not matching the rotation cycle of the color wheel and sampling cycle, the electric power of all the segments is detected, and the mean electric power of the electric power of all the segments is found. Thus, feedback control is carried out. Therefore, it is possible to control the value of the mean lamp electric power to be approximately identical to the standard lamp electric power. By appropriately selecting the rotation cycle of the color wheel and sampling cycle, the number of samplings until the feedback control occurs may be increased, thereby improving the precision of the mean lamp electric power. Ideally, if the electric power for all the segments can be detected within one rotation of the color wheel, the mean lamp electric power can be matched to the standard electric power with high precision; however, a processor that can detect the electric power at a high speed is expensive and practically it is not realistic. In the above, an example of the calculation of the mean electric power is shown, other methods may be acceptable to find the mean value, such that the detected lamp electric power is successively accumulated in the memory 33, and its mean is calculated when a designated amount of data is stored in the memory. In addition, the above-mentioned embodiment describes a projector device using DMD (trademark), nonetheless, the described may be similarly applied to those that employ a liquid crystal panel, or LCOS (liquid crystal on silicon) (trademark).

The preceding description has been presented only to illustrate and describe exemplary embodiments of the present high-pressure discharge lamp lighting device. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A high-pressure discharge lamp lighting device in operative connection with a color wheel and a discharge lamp, comprising:
    an electric power detection circuit that detects a supply power supplied to the discharge lamp for each segment that corresponds to a rotation angle of the color wheel; and
    a control circuit that includes:
        a sampling circuit for sampling the supply power,
        a memory that stores results of sampling the supply power,
        a mean power calculator that calculates the mean power at a designated duration based on the results retained in the memory, and
        a power control part that controls a feedback supply power to the discharge lamp based on the mean power,
    wherein sampling the supply power follows a sampling cycle set to $Ts > Tc/C$ and $Ts \neq N \times Tc$, wherein N is a whole number, Ts is the sampling cycle, C is a total number of segments of the color wheel, and Tc is a cycle for scanning of all the segments of the color wheel.

2. A high-pressure discharge lamp lighting device according to claim 1, wherein said sampling cycle Ts is set so that $Ts \leq 60$ seconds.

* * * * *